United States Patent

Aoki et al.

[11] Patent Number: 6,044,043
[45] Date of Patent: Mar. 28, 2000

[54] MAGNETO-OPTICAL HEAD CAPABLE OF OPERATION UNDER INCLINATION OF THE DISC

[75] Inventors: Yoshitaka Aoki, Kanagawa; Tetsu Watanabe, Tokyo, both of Japan

[73] Assignee: Sony Corporation, Tokyo, Japan

[21] Appl. No.: 09/046,275

[22] Filed: Mar. 23, 1998

[30] Foreign Application Priority Data

Mar. 25, 1997 [JP] Japan ................................. 9-071398

[51] Int. Cl.[7] .................................................. G11B 11/00
[52] U.S. Cl. ............................................... 369/13; 360/114
[58] Field of Search ............................... 369/13, 14, 110, 369/116; 360/114, 59; 365/122

[56] References Cited

U.S. PATENT DOCUMENTS

| | | | |
|---|---|---|---|
| 5,233,597 | 8/1993 | Nakayama et al. | 369/275.1 |
| 5,260,921 | 11/1993 | Shibuya et al. | 369/13 |
| 5,305,294 | 4/1994 | Kime et al. | 369/13 |
| 5,434,831 | 7/1995 | Ishii et al. | 369/13 |
| 5,689,478 | 11/1997 | Ishii et al. | 369/13 |

*Primary Examiner*—Tan Dinh
*Attorney, Agent, or Firm*—Limbach & Limbach, LLP

[57] ABSTRACT

A head unit is provided which is able to satisfactorily record/reproduce an information signal to and from a disk even if the disk can considerably be inclined (deflected) by a load applied by the head. The load applied from the magnetic head to the disk is set to be not larger than an upper limit which is calculated in accordance with a permissible range for incident angles of laser beams emitted from the optical head to the disc-shape recording medium, the thickness of the disc-shape recording medium and the radius of the disc-shape recording medium. As an alternative to this, the load is set to be not larger than an upper limit calculated in accordance with a permissible range of the amount of deviation between the point to which laser beams emitted from the optical head to the disc-shape recording medium and a point to which laser beams are converged, the thickness of the disc-shape recording medium and the radius of the disc-shape recording medium.

16 Claims, 8 Drawing Sheets

MAGNETO-OPTICAL HEAD CAPABLE OF OPERATION UNDER INCLINATION OF THE DISC

BACKGROUND OF THE INVENTION

1. Field of the Invention

The present invention relates to a head unit having a magnetic head of a type which applies a load (a pressure to be applied) to a disc-shape recording medium when a signal is recorded or reproduced.

2. Related Background Art

An overwriting-type magneto-optical disk using modulation of a magnetic field must be subjected to a process that the ferromagnetic field is modulated with high-frequency waves. Therefore, a magnetic head of a recording/reproducing apparatus (a hard disk drive unit) must be disposed adjacent to the signal recording surface of the magneto-optical disk.

As a method of disposing the magnetic head adjacent to the signal recording surface of the magneto-optical disk, a method arranged as shown in FIG. 1 has widely been used. The method is arranged in such a manner that a magnetic head 21 is joined to a floating-type slider 22. The slider 22 is joined to the leading end of a suspension 23 constructed of a leaf spring. Thus, the slider 22 is pressed against the signal recording surface 1a of the magneto-optical disk 1 by the spring force of the suspension 23.

When the magneto-optical disk 1 is rotated at high speed, air is introduced into a space between the magneto-optical disk 1 and the slider 22, as shown in FIG. 2. Thus, an air film layer 41 is formed which causes the slider 22 to float from the magneto-optical disk 1 at a predetermined height h.

The reason why the magnetic head 21 is formed into the floating-type structure also lies in that the data-transmission rate must be raised. To raise the data-transmission rate, the recording density in the direction along the track lines of the disk must be raised. Moreover, the rotational speed of the disk must be raised to raise the data reading/writing speed in the direction of the track lines.

For example, a magneto-optical recording and reproducing apparatus of a type which is known as a minidisk system includes a head unit having a magnetic head which slides on the surface of a disk while applying a relatively low pressure to the disk. The reason for this is that the disk is rotated at relatively low speed. If a disk for use in a computer system or a multimedia system requiring higher recording density is rotated at high speed, there is apprehension that the surface of the disk is scratched or the load which is imposed during the sliding process is enlarged if the sliding-type magnetic head is employed.

If a disk having the sliding surface, the flatness of which is unsatisfactory, is rotated at high speed, a complete sliding state cannot be realized. In this case, the slider having the magnetic head mounted thereon jumps on the surface of the disk. It leads to a fact that a constant distance cannot be maintained from the recording surface of the disk to the magnetic head. As a result, the recording operation cannot satisfactorily be performed.

The above-mentioned problem experienced with the sliding-type magnetic head can be solved by the floating-type magnetic head. Even if the rotational speed of the disk is raised, the surface of the disk cannot be scratched or the load which is imposed during the sliding process cannot be enlarged. Moreover, a constant distance can be maintained from the recording surface (the recording layer) even if the flatness of the surface of the disk is unsatisfactory. Therefore, the ferromagnetic recording and reproducing systems requiring a high density recording operation usually include the floating-type magnetic heads.

The recording and reproducing apparatus including the floating-type magnetic head and structured as shown in FIG. 1 is required to stabilize the attitude of a slider 22 during the period in which the slider 22 is allowed to float. To achieve this, the slider 22 is pressed against a magneto-optical disk 1 under a predetermined pressure by the spring force of a suspension 23. Therefore, a load imposed by the suspension 23 and the like is applied to the magneto-optical disk 1 because of the reaction of the slider 22 during the period in which the slider 22 is allowed to float. Therefore, force for inclining (deflecting) the magneto-optical disk 1 acts on the magneto-optical disk 1.

If the magneto-optical disk 1 has a small radius and a large thickness, the magneto-optical disk 1 is not inclined (deflected) even if a load is applied. Even if the magneto-optical disk 1 is inclined, the amount of the inclination is negligible because the amount of the inclination is too small to adversely affect the performance for recording a signal.

In recent years, the requirement for raising the recording density results in the thickness of the disk being reduced. The reduction in the thickness of the disk is caused from the following reason.

If an optical system including a short-wave laser unit and having a high-NA is employed, the skew margin for the disk is reduced. The skew margin is a permissible range in which the writing/reading operation can be performed normally even if the incident angle of a laser beam made from the recording surface of the disk is skewed from a perpendicular direction. The problem of the skew angle arises when the shape and distribution of the laser spot formed on the recording surface are deflected because of the difference in the optical path for the laser beam. Conversely, the difference in the optical path can be reduced (that is, the skew margin can be enlarged) even if the laser beam is skewed (even if the optical axis of the incident laser beam is inclined) by enlarging the thickness of the disk. That is, the reduction in the skew margin occurring when the recording density has been raised can be compensated by the enlargement of the skew margin which can be realized by reducing the thickness of the disk. Therefore, the thickness of the disk has been reduced.

If the reduction in the thickness of the disk is attempted or a disk having a larger radius is employed, the inclination of the magneto-optical disk 1 realized by dint of the load applied from the magnetic head 21 (the slider 22) to the magneto-optical disk 1 is enlarged excessively. Thus, the performance for recording/reproducing a signal deteriorates.

FIG. 3 shows a state in which the magneto-optical disk 1 is deflected. FIG. 3A shows a disk 1X having a relatively small radius and a considerably large thickness. In this case, the disk 1X is free from considerable deflection. FIG. 3B shows a disk 1Y having a relatively large radius and a relatively small thickness. In this case, the disk 1Y is deflected considerably. FIGS. 4A and 4B are enlarged views showing portions shown in FIGS. 3A and 3B in each of which deflection takes place.

If the deflection of the magneto-optical disk 1 is enlarged, the skew angle is affected and deviation takes place between the point to which the laser beams are converged and the area to which a magnetic field is applied.

The influence exerted upon the skew angle will now be described.

An optical pickup 31 for recording/reproducing a signal is, as shown in FIGS. 3A, 3B, 4A and 4B, disposed immediately below the magnetic head 21. If deflection does not take place by dint of the load applied by the slider 22 (or if the amount of the deflection is small), the optical axis J of the laser beam emitted from the optical pickup 31 is made to be substantially perpendicular to the recording surface of the disk, as shown in FIGS. 3A and 4A. That is, the skew angle SKA can be made to be substantially 90°.

If the relatively great deflection takes place as shown in FIGS. 3B and 4B and thus the disk is inclined, the skew angle SKA is considerably deviated from 90°. That is, the laser beam cannot impinge on the surface of the disk. In this case, the skew angle exceeds the skew margin, thus causing the performance for recording/reproducing a signal to deteriorate excessively.

The deviation takes place between the light converging position and the area to which the magnetic field is applied. If substantially no deflection takes place, as shown in FIGS. 3A and 4A, the center of the core portion of the magnetic head 21 is brought to a substantially required position with respect to the position (the position of the optical axis J) to which the laser beams emitted from the optical pickup 31 are converged. If relatively great deflection takes place and thus the surface of the disk is inclined, as shown in FIGS. 3B and 4B, the positional relationship between the point to which the laser beams are converged and the center of the core portion of the magnetic head 21 is changed. That is, the magnetic head 21 cannot satisfactorily apply a magnetic field to the position which is being heated by the laser beam. As a result, the recording performance deteriorates critically.

SUMMARY OF THE INVENTION

An object of the present invention is to prevent deterioration in the performance for recording/reproducing a signal to and from a magneto-optical disk which has, for example, a small thickness and/or a large radius and which can considerably be inclined (deflected).

To achieve the object, a load which is applied from the -magnetic head (an optical pickup) to the disc-shaped recording medium is set to be not larger than an upper limit calculated in accordance with a permissible range for incident angles of laser beams emitted from the optical head to the disc-shaped recording medium, the thickness of the disc-shaped recording medium and the radius of the disc-shaped recording medium. That is, the load (the pressure) of the head is set to make the maximum amount of inclination occurring attributable to the load to satisfy the permissible range for the skew angle in accordance with the disc-shaped recording medium adaptable to the recording/reproducing apparatus on which the head unit is mounted.

The load which is applied from the magnetic head to the disc-shaped recording medium is set to be not larger than an upper limit calculated in accordance with a permissible range of the amount of deviation between the point to which laser beams emitted from the optical head to the disc-shaped recording medium and a point to which laser beams are converged, the thickness of the disc-shaped recording medium and the radius of the disc-shaped recording medium. That is, the load (the pressure) of the head is set in such a manner that the maximum inclination of the surface of the disk occurring attributable to deflection caused from the load corresponds to the permissible range for the deviation between the point to which laser beams are converged and the area to which a magnetic field is applied.

Moreover, the load which is applied to the disc-shaped recording medium from the magnetic head is set to be not larger than the smaller upper limit of the upper limit for the skew angle and that for the deviation between the point to which laser beams are converged and the area to which a magnetic field is applied. That is, the maximum inclination satisfies both of the permissible range for the skew angle and the amount of deviation between the point to which laser beams are converged and the area to which a magnetic field is applied.

Other objects, features and advantages of the invention will be evident from the following detailed description of the preferred embodiments described in conjunction with the attached drawings.

DESCRIPTION OF THE PREFERRED EMBODIMENTS

A head unit according to an embodiment of the present invention will now be described.

Figure 5:
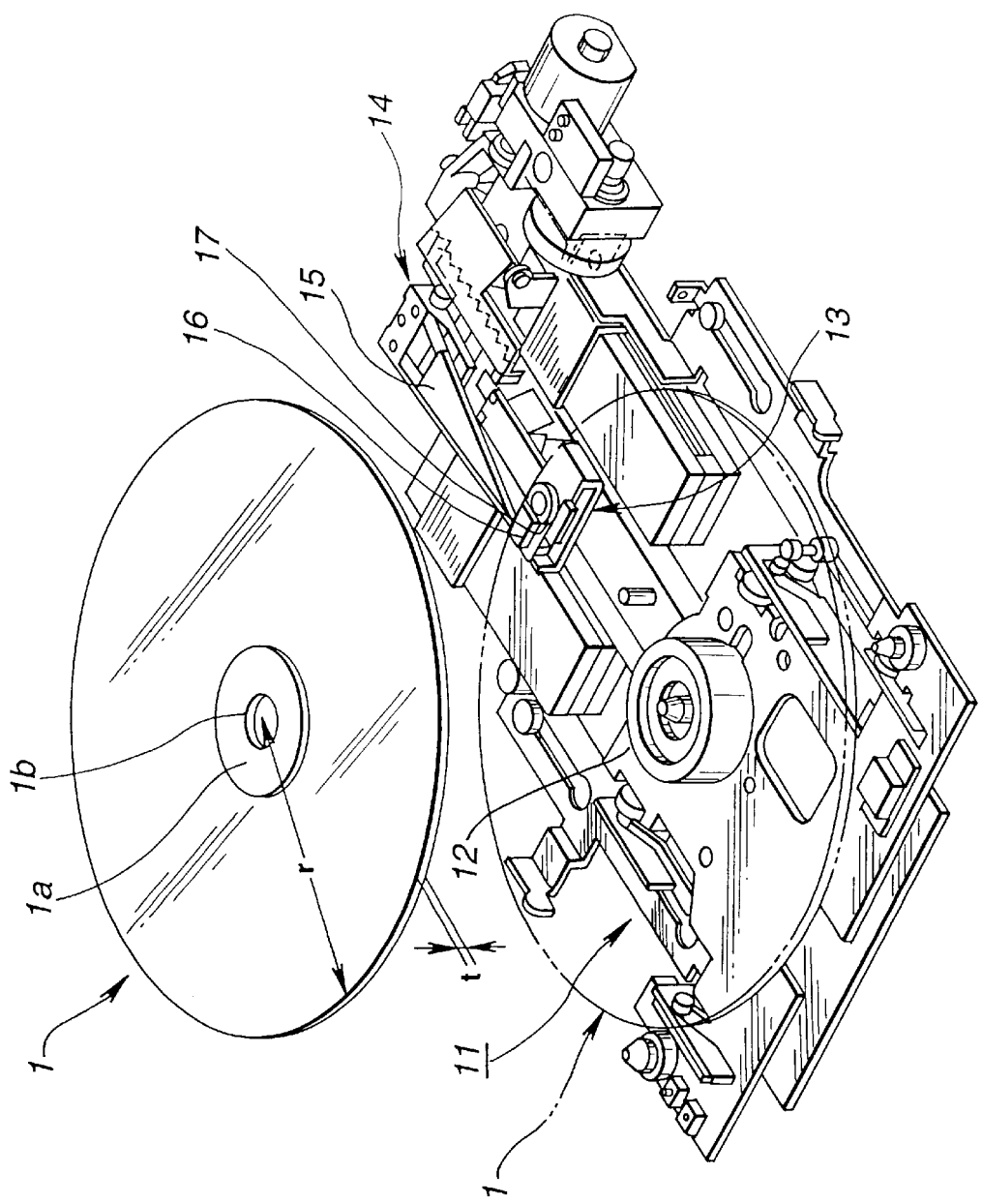
FIG. 5 is a perspective view showing a disk drive unit on which a head unit according to an embodiment of the present invention is mounted.

FIG. 5 is a perspective view showing a magneto-optical disk 1 and a disk drive apparatus 11 of a recording/reproducing apparatus on which a head unit according to this embodiment is mounted. The magneto-optical disk 1 is formed into a disc shape having radius r and thickness t. The central portion of the magneto-optical disk 1 is formed into a thick portion (having a thickness of about 2t) 1a. A central hole 1b for centering the magneto-optical disk 1 is formed in the central portion of the thick portion 1a.

Figure 6:
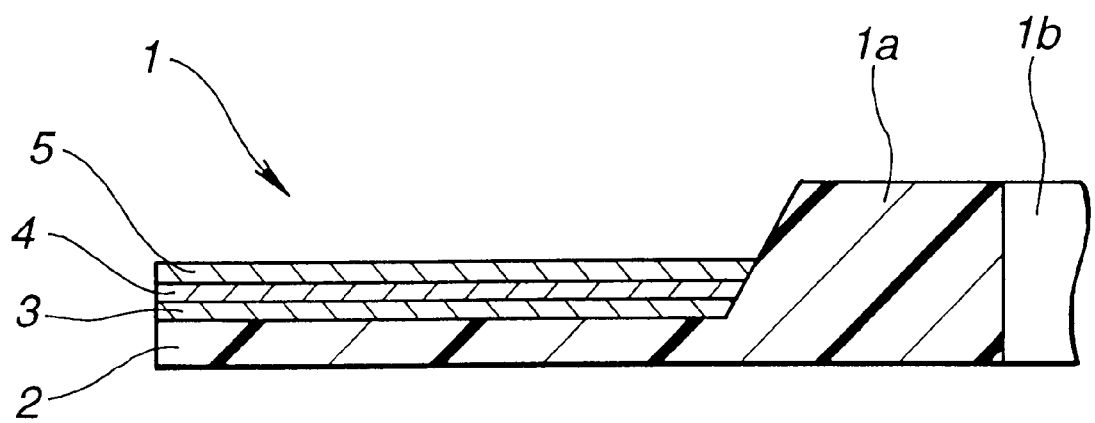
FIG. 6 is a cross sectional view showing a disk for use to record/reproduce a signal by the head unit according to the embodiment of the present invention.

As shown in FIG. 6 which is an enlarged cross sectional view, the magneto-optical disk 1 is formed in such a manner that a substrate 2 is formed by sequentially stacking a dielectric-film layer 3, a signal recording film layer 4 and a protective-film layer 5. The substrate 2 is made of transparent synthetic resin, such as polycarbonate. The dielectric-film layer 3 is made of $SiO_2$. The signal recording film layer 4 is made of a magneto-optical material, for example, TbFe, GdTbFe, GdFeCo or the like. The protective-film layer 5 is made of a UV (ultraviolet) curing resin (hereinafter simply called a "UV resin").

The protective-film layer 5 is formed in such a manner that the dielectric-film layer 3 and the signal recording film layer 4 are formed on the substrate 2 in micron units. Then, a coating material, the main component of which is the UV resin, is applied to the surface of the signal recording film layer 4. Then, the substrate 2 having the foregoing elements is rotated at high speed so that the coating material is caused to have a uniform thickness. Then, ultraviolet rays are applied to the UV resin layer so that the UV resin layer is cured. Thus, the protective-film layer 5 is formed.

As shown in FIG. 5, the disk drive apparatus 11 has a disk rotation drive mechanism 12 including a disk table and a spindle motor for rotating the magneto-optical disk 1.

Moreover, an optical pickup 13 for recording/reproducing an information signal to and from the magneto-optical disk 1 and a carriage (a moving frame) 14 for moving the optical pickup 13 in the radial direction of the magneto-optical disk 1 are disposed below the magneto-optical disk 1 which is rotated by the disk rotation drive mechanism 12.

A suspension 15 including a leaf spring is joined to the carriage 14 in such a manner that the magneto-optical disk 1 is held between the suspension 15 and the optical pickup 13, the suspension 15 being disposed above the upper surface of the magneto-optical disk 1. A floating-type slider 16 is joined to the leading end of the suspension 15, the slider 16 being structured in such a manner that the slider 16 is pressed against the protective-film layer 5 of the magneto-optical disk 1 under a predetermined load F by dint of the spring force of the suspension 15.

A magnetic head 17 for applying an external magnetic field to the signal recording film layer 4 of the magneto-optical disk 1 is joined to an end of the slider 16 so that the magnetic head 17 is positioned opposite to the optical pickup 13 which is disposed immediately below the magnetic head 17.

Figure 1:
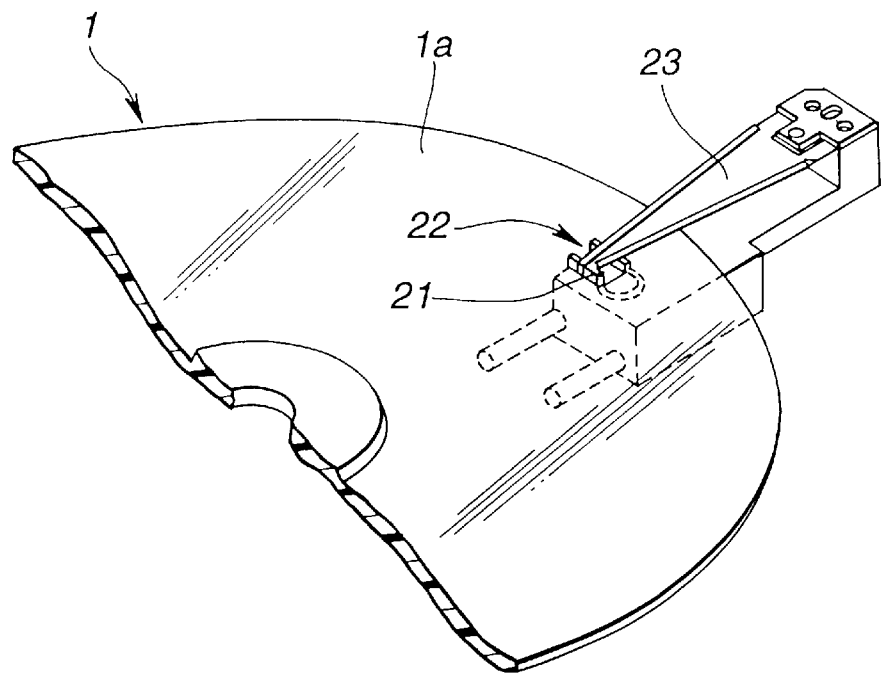
FIG. 1 is a diagram showing a conventional head unit.
Figure 2:
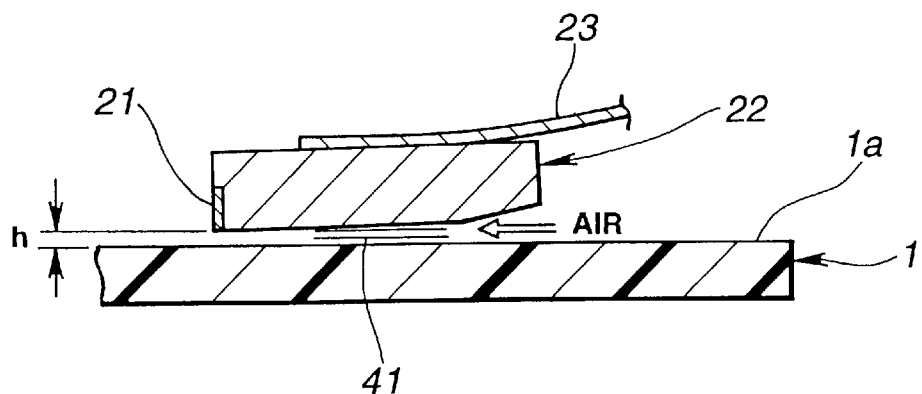
FIG. 2 is a diagram showing the operation of a floating-type head unit.
Figure 3A:
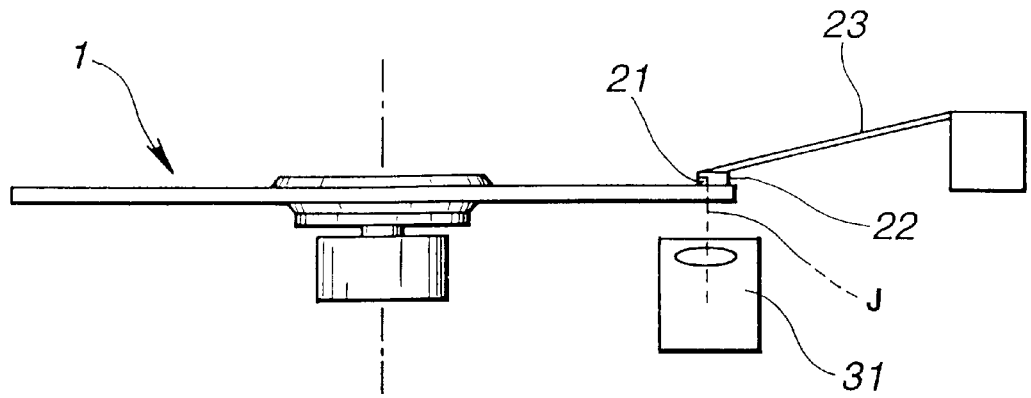
FIGS. 3A and 3B are diagrams showing an adverse influence imposed by deflection occurring attributable to a load applied by the head.
Figure 3B:
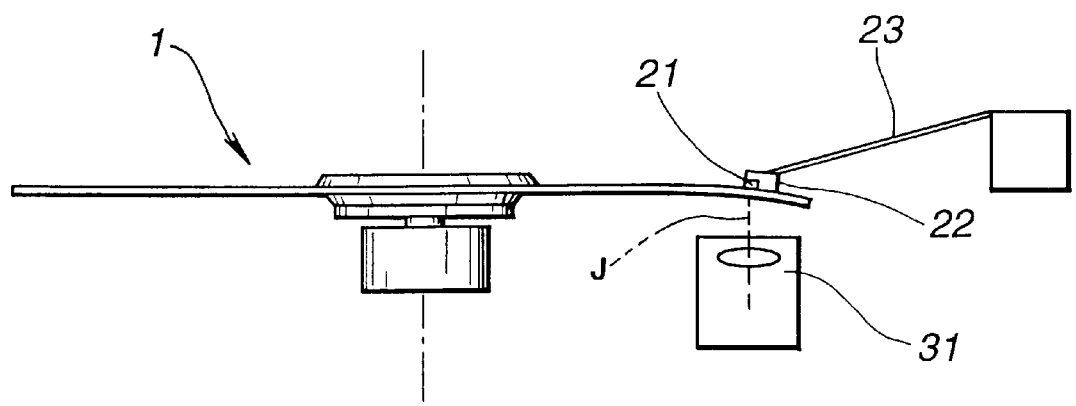
Figure 4A:
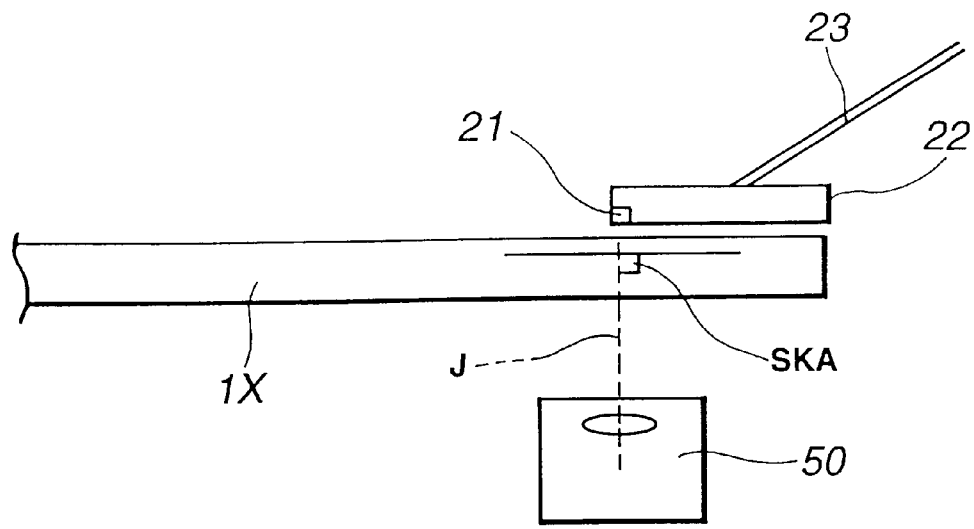
FIGS. 4A and 4B are diagrams showing an adverse influence imposed by deflection occurring attributable to a load applied by the head.
Figure 4B:
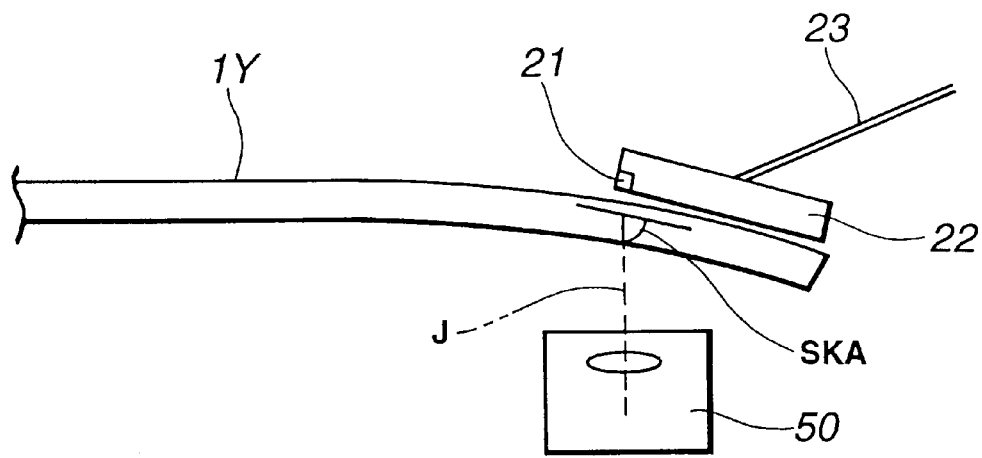

The head unit according to this embodiment is structured as described with reference to FIG. 2 in such a manner that the magnetic head 17 is allowed to float from the surface of the magneto-optical disk 1 by the floating-type slider 16.

A laser beam emitted from the optical pickup 13 is applied to the signal recording film layer 4 of the magneto-optical disk 1 so that the temperature of the impinged portion is raised to a level not lower than a Curie temperature. Moreover, the magnetic head 17 provided for the slider 16 applies an external magnetic field to the signal recording film layer 4 of the magneto-optical disk 1. As a result, the magnetization direction of the signal recording film layer 4 heated with the laser beam and thus lost the coercive force is inverted to follow that of the external magnetic field of the magnetic head 17. Thus, a signal can be recorded on the signal recording film layer 4.

A process for setting a load will now be described which is applied by the magnetic head mechanism (the magnetic head 17, the slider 16 and the suspension 15) to the surface of the magneto-optical disk 1.

If the magneto-optical disk 1 is deflected by the load applied to the surface thereof, the skew is affected adversely and the deviation takes place between the area to which the magnetic field is applied and the point to which the laser beams are converged.

A method of setting the load which is applied by the magnetic head mechanism in such a manner that the adverse influence on the skew will now be described.

Figure 7:
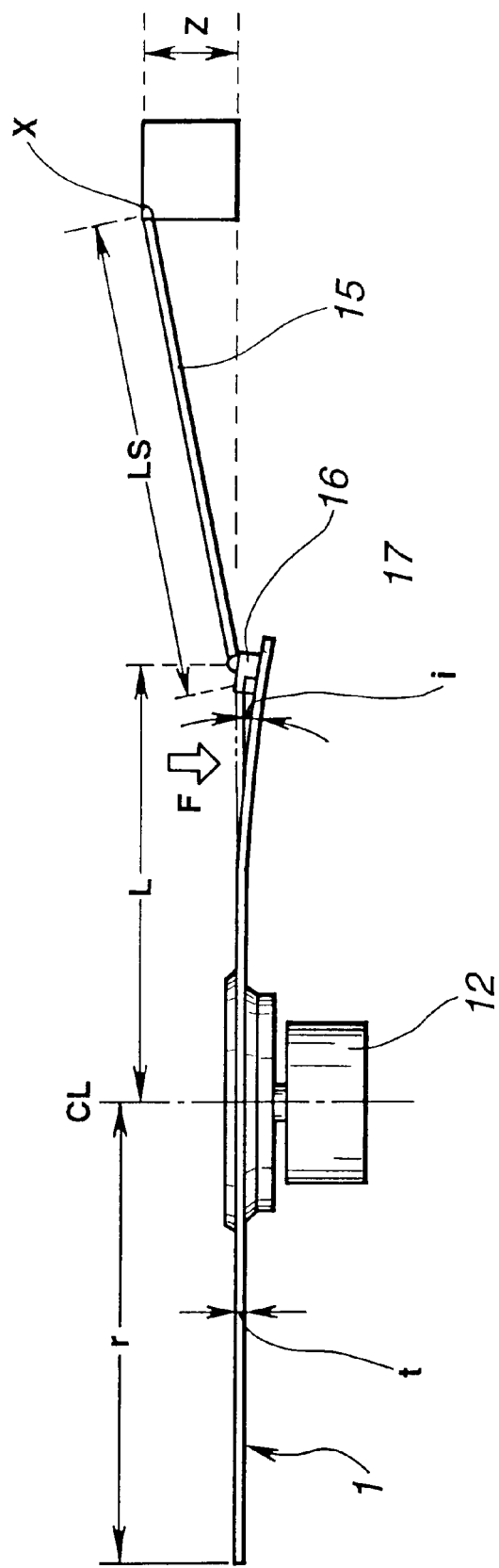
FIG. 7 is a diagram showing a state of deflection of the disk occurring attributable to the load of the head.

When the slider 16 is pressed against the magneto-optical disk 1 under a predetermined load F by the spring force of the suspension 15, the magneto-optical disk 1 is inclined as shown in FIG. 7.

Inclination i of the magneto-optical disk 1 caused by the load F and distance L from the rotation center CL of the magneto-optical disk 1 to the slider 16, the radius r of the magneto-optical disk 1 and the thickness t of the magneto-optical disk 1 shown in FIG. 7 substantially satisfy the following relationship:

[Equation 1]

$$i = \beta \times F \times \frac{L^2}{t^3}$$

where $\beta$ is a constant which is determined by the material and the like of the magneto-optical disk 1.

The maximum inclination iMAX is realized when the magnetic head 17 is positioned at the outermost position of the magneto-optical disk 1, that is, when distance L = radius r is satisfied. Therefore, the following relationship is satisfied.

[Equation 2]

$$iMAX = \beta \times F \times \frac{r^2}{t^3}$$

Therefore, if the material, the radius, the thickness and the like of the magneto-optical disk 1 are determined, the inclination of the magneto-optical disk 1 realized at the position immediately below the magnetic head 17 to which the slider 16 is joined can be estimated in accordance with the above-mentioned equation.

The skew margin will now be described. Since specifications for manufacturing only the magneto-optical disk 1 must be considered, a skew margin of, for example, about 7 mrad is permitted for the magneto-optical disk 1.

Similarly, a skew margin of about 7 mrad is provided for the part tolerances and variations with time of the optical pickup 13 and other mechanisms (a mechanical deck chassis, the disk rotation drive mechanism 12 and the like) of the disk drive apparatus 11.

A limit amount of the skew margin which is considered permissible to be generated by dint of the load F of the magnetic head mechanism is 2 mrad or smaller of the above-mentioned amount of the skew margin of 7 mrad.

Figure 9:
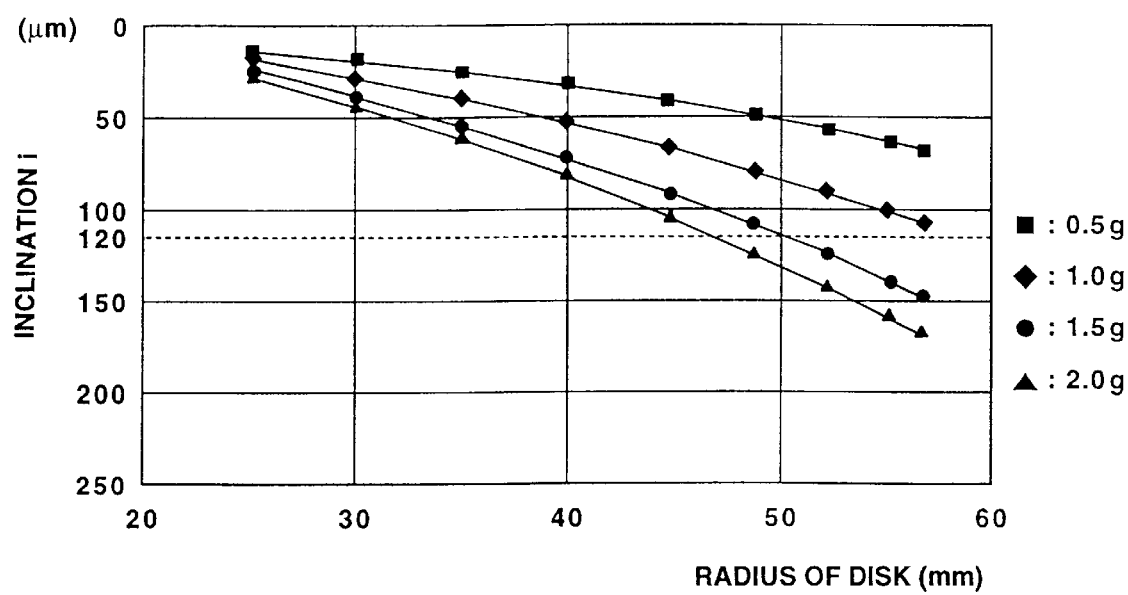
FIG. 9 is a graph showing the relationship between the inclination of the disk and the radius position.

FIG. 9 is a graph showing the relationship between the radius position of the disk and the inclination i when the load F applied by the magnetic head mechanism is varied to 0.5 g, 1.0 g, 1.5 g and 2.0 g. That is, FIG. 9 is a graph showing curves indicating inclinations i calculated in accordance with the above-mentioned Equation 1 and by using the thickness of the disk, the radius position and the load F.

As shown in FIG. 9, the inclinations i are indicated by second-order and non-linear curves with respect to the positions of the magnetic head 17 in the radial direction.

A differential value at the radial position on the curve corresponds to the inclination of the portion corresponding to the point to which the laser beams emitted from the optical pickup 13 are converged, that is, the skew angle.

When the inclination of the disk is obtained at the outermost point at which the inclination is the maximum, inclinations are about 2 mrad when the load F is 0.5 g, about 4 mrad when the load F is 1.0 g and about 6 mrad when the load F is 2.0 g.

When the skew margin permissible to be generated by the load F of the magnetic head mechanism is set to be 2 mrad, the differential value of the inclination i which is obtained by a calculation using the thickness t and the radius r of the disk and the load F is required to be a value not larger than 2 mrad. In this case, the spring pressure of the suspension 15 is determined in such a manner that the load F is not larger than 0.5 g. Thus, the amount of deflection of the magneto-optical disk 1 can be limited to be smaller than the skew margin. As a result, deterioration in the performance for recording/reproducing an information signal occurring in accordance with the state of the skew can be prevented.

A method of setting the load F will now be described which is applied by the magnetic head mechanism in such a manner that deviation between the area to which the magnetic field is applied and the point to which the laser beams are converged can be prevented.

The slider 16 is pressed against the magneto-optical disk 1 under a predetermined load F by dint of the spring force of the suspension 15. If the inclination is enlarged by the deflection of the magneto-optical disk 1, the slider 16 is rotated relative to a fulcrum x. As a result, the core center of the magnetic head 17 is deviated from the point to which laser beams emitted from the optical pickup 13 are converged.

An assumption is made that the distance from the fulcrum x shown in FIG. 7 to the core center of the magnetic head 17 and which is defined by the length of the slider 16 and that of the suspension 15 for supporting the slider 16 is LS. Another assumption is made that the height from the fulcrum x to the surface of the disk is Z. The amount a of deviation of the core center can be obtained in accordance with the following equation by using the distance LS, the distance Z and the inclination i obtained in accordance with the above-mentioned Equation 1:

[Equation 3]

$$\alpha = (LS^2 - Z^2)^{1/2} - (LS^2 - (Z+i)^2)^{1/2}$$

Figure 8:
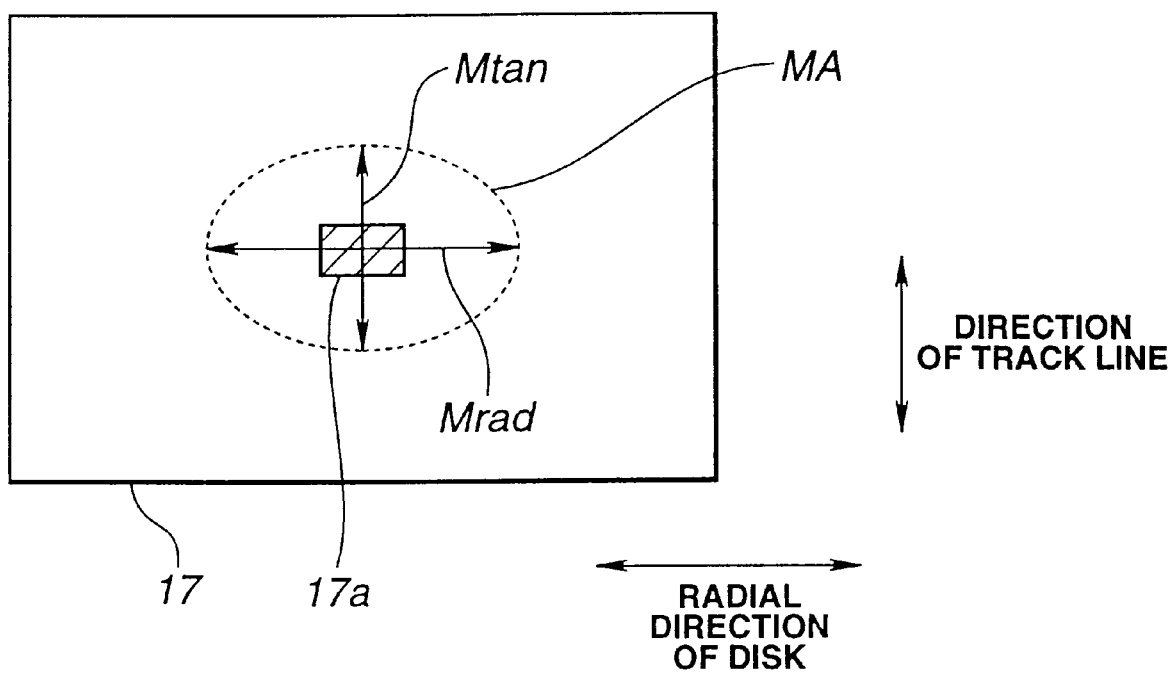
FIG. 8 is a diagram showing an area to which a magnetic field is applied by a magnetic head according to the embodiment of the present invention.

As schematically shown in, for example, FIG. 8, the area MA to which the magnetic field is applied by the magnetic head 17 has a length of Mrad ($\mu$m) from the core center 17a in the radial direction of the disk and a length of Mtan ($\mu$m) from the same in the direction of the track lines. Specifically, Mrad ($\mu$m) is about 150 $\mu$m and Mtan ($\mu$m) is about 100 $\mu$m.

The length of Mrad ($\mu$m)=150 $\mu$m in the radial direction of the disk includes a locating accuracy for the magnetic head 17 (that is, the accuracy of the point to which the core center 17a is joined with respect to the point to which the laser beams are converged) and the amount of shift of the magnetic head 17 as time elapses (that is, the deviation of the core center 17a with respect to the point to which the laser beams are converged occurring as the time elapses). Also the amount of movement of a tracking actuator for moving the objective lens of the optical pickup 13 in the radial direction of the disk is included.

An assumption is made that the permissible amount $\alpha$ of deviation of the core center 17a from the point to which laser beams are converged is set to be 10 $\mu$m.

If the magnetic head mechanism according to this embodiment is arranged in such a manner that the distance LS is 40 mm and the distance Z is 3 mm, the amount $\alpha$ of deviation and the inclination i of the magneto-optical disk 1 satisfy the following relationship in accordance with the Equation 3:

$$\alpha = (40^2 - 3^2)^{1/2} (40^2 - (3+i)^2)^{1/2}$$

If the permissible amount $\alpha$ of deviation of the core center 17a is set to be 10 $\mu$m, the inclination i must be about 120 $\mu$m or smaller.

As can be understood from FIG. 9, the load F must be about 1.0 g or smaller to make the inclination i to be 120 $\mu$m or smaller.

That is, the maximum inclination i is obtained in accordance with the permissible amount a of deviation of the core center 17a. Then, the relational expression among the thickness t of the disk, the radius of r of the same and the inclination i is used to select a load F with which the inclination i does not exceed the maximum value. Then, the spring pressure and the like are set to realize the load F. Thus, the amount of deflection of the magneto-optical disk 1 can be made to be smaller than the permissible range for the deviation between the area to which the magnetic field is applied and the point to which laser beams are converged. As a result, deterioration in the performance for recording an information signal occurring when deviation has taken place can be prevented.

In the above-mentioned embodiment, the load F is set to prevent enlargement of the skew and the deviation between the area to which a magnetic field is applied and the point to which laser beams are converged. In the foregoing example, the load F is set to be 0.5 g or smaller to prevent excessive skew and the load F is set to be 1.0 g or smaller to prevent deviation between the area to which a magnetic field is applied and the point to which laser beams are converged. Therefore, the severer condition is employed to satisfy the two requirements. That is, it is preferable that the load F is made to be F =0.5 g or smaller.

In the above-mentioned example, the load F for preventing enlargement of the skew must satisfy the severer condition. However, the load F for preventing the deviation between the area to which a magnetic field is applied and the point to which laser beams are converged must sometimes satisfy a severer condition in accordance with the design of the optical system, that of the magnetic head, the characteristics of the disk and the like. As a matter of course, the load F is required to satisfy the severer condition in the above-mentioned case.

As described above, the head unit according to the present invention has the structure that a load which is applied from the magnetic head (an optical pickup) to the disc-shaped recording medium is set to be not larger than an upper limit calculated in accordance with a permissible range for incident angles of laser beams emitted from the optical head to the disc-shaped recording medium, the thickness of the disc-shaped recording medium and the radius of the disc-shaped recording medium. As a result, an effect can be obtained in that enlargement of the deflection of the disc-shaped recording medium occurring attributable to the load of the head to exceed the skew margin and deteriorate the performance for recording/reproducing an information signal can be prevented.

The load which is applied from the magnetic head to the disc-shaped recording medium is set to be not larger than an upper limit calculated in accordance with a permissible range of the amount of deviation between the point to which laser beams emitted from the optical head to the disc-shaped recording medium and a point to which laser beams are converged, the thickness of the disc-shaped recording medium and the radius of the disc-shaped recording medium. As a result, an effect can be obtained in that enlargement of the deflection of the disc-shaped recording medium occurring attributable to the load of the head to exceed the permissible deviation between the point to which laser beams are converged and the area to which a magnetic field is applied can be prevented. Thus, deterioration in the performance for recording/reproducing an information signal can be prevented.

Moreover, the load which is applied to the disc-shaped recording medium from the magnetic head is set to be smaller than the smaller upper limit of the upper limit for the skew angle and that for the deviation between the point to which laser beams are converged and the area to which a magnetic field is applied. Thus, the maximum inclination of the disc-shaped recording medium can be made to satisfy the permissible ranges for both the skew angle and the deviation between the point to which laser beams are converged and the area to which a magnetic field is applied. As a result, deterioration in the performance for recording/reproducing an information signal can be prevented.

As a result, a head unit can be realized which is able to satisfactorily record/reproduce an information signal to and from a magneto-optical disk even if the disk has a small thickness or a large radius and therefore the disk can considerably be inclined (deflected).

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magneto-optical recording and reproducing apparatus comprising:

an optical head and a magnetic head disposed opposite to each other across a disc-shaped recording medium so as to record/reproduce a signal to and from the disc-shaped recording medium, wherein a load applied from said magnetic head to the disc-shaped recording medium is set to be not larger than an upper limit calculated as a function of a predetermined range for incident angles of laser beams emitted from said optical head to the disc-shaped recording medium, a thickness of the disc-shaped recording medium and a radius of the disc-shaped recording medium.

2. A magneto-optical recording and reproducing apparatus comprising:

an optical head and a magnetic head disposed opposite to each other across a disc-shaped recording medium so as to record/reproduce a signal to and from the disc-shaped recording medium, wherein a load applied from said magnetic head to the disc-shaped recording medium is set to be not larger than an upper limit calculated as a function of a predetermined range of an amount of deviation between a first point to which laser beams are emitted from said optical head to the disc-shaped recording medium and a second point to which laser beams are converged, a thickness of the disc-shaped recording medium and a radius of the disc-shaped recording medium.

3. A magneto-optical recording and reproducing apparatus comprising:

an optical head and a magnetic head disposed opposite to each other across a disc-shaped recording medium so as to record/reproduce a signal to and from the disc-shaped recording medium, wherein a bias force which is applied from said magnetic head to the disc-shaped recording medium is set to be not larger than a smaller one of:

a first upper limit calculated as a first function of a predetermined range for incident angles of laser beams emitted from said optical head to the disc-shaped recording medium, the thickness of the disc-shaped recording medium and the radius of the disc-shaped recording medium; and a second upper limit calculated as a second function of a predetermined range of an amount of deviation between a first point to which laser beams are emitted from said optical head to the disc-shaped recording medium and a second point to which laser beams are converged, a thickness of the disc-shaped recording medium and a radius of the disc-shaped recording medium.

4. The magneto-optical recording and reproducing apparatus of claim 1, wherein said function is further calculated using a value corresponding to a material of said disc-shaped recording medium.

5. The magneto-optical recording and reproducing apparatus of claim 2, wherein said function is further calculated using a value corresponding to a material of said disc-shaped recording medium.

6. The magneto-optical recording and reproducing apparatus of claim 3, wherein said first function is further calculated using a value corresponding to a material of said disc-shaped recording medium, and said second function is further calculated using said value corresponding to said material of said disc-shaped recording medium.

7. The magneto-optical recording and reproducing apparatus of claim 3, wherein said first function is further calculated using a value corresponding to a material of said disc-shaped recording medium.

8. The magneto-optical recording and reproducing apparatus of claim 3, wherein said second function is further calculated using a value corresponding to a material of said disc-shaped recording medium.

9. A method of operating a magneto-optical recording and reproducing apparatus having an optical head and a magnetic head disposed opposite to each other across a disc-shaped recording medium so as to record/reproduce a signal to and from the disc-shaped recording medium, comprising the step of:

applying a load from said magnetic head to the disc-shaped recording medium, wherein said load is set to be not larger than an upper limit calculated as a function of a predetermined range for incident angles of laser beams emitted from said optical head to the disc-shaped recording medium, a thickness of the disc-shaped recording medium and a radius of the disc-shaped recording medium.

10. The magneto-optical recording and reproducing method of claim 9, wherein said function is further calculated using a value corresponding to a material of said disc-shaped recording medium.

11. A method of operating a magneto-optical recording and reproducing apparatus having an optical head and a magnetic head disposed opposite to each other across a disc-shaped recording medium so as to record/reproduce a signal to and from the disc-shaped recording medium, comprising the step of:

applying a load from said magnetic head to the disc-shaped recording medium, wherein said load is set to be not larger than an upper limit calculated as a function of a predetermined range of an amount of deviation between a first point to which laser beams are emitted from said optical head to the disc-shaped recording medium and a second point to which laser beams are converged, a thickness of the disc-shaped recording medium and a radius of the disc-shaped recording medium.

12. The magneto-optical recording and reproducing method of claim 11, wherein said function is further calculated using a value corresponding to a material of said disc-shaped recording medium.

13. A method of operating a magneto-optical recording and reproducing apparatus having an optical head and a magnetic head disposed opposite to each other across a disc-shaped recording medium so as to record/reproduce a signal to and from the disc-shaped recording medium, comprising the step of:

applying a bias force from said magnetic head to the disc-shaped recording medium, wherein said bias force is set to be not larger than a smaller one of:

a first upper limit calculated as a first function of a predetermined range for incident angles of laser beams emitted from said optical head to the disc-shaped recording medium, the thickness of the disc-shaped recording medium and the radius of the disc-shaped recording medium; and a second upper limit calculated as a second function of a predetermined range of an amount of deviation between a first point to which laser beams are emitted from said optical head to the disc-shaped recording medium and a second point to which laser beams are converged, a thickness of the disc-shaped recording medium and a radius of the disc-shaped recording medium.

14. The magneto-optical recording and reproducing method of claim 13, wherein said first function is further calculated using a value corresponding to a material of said disc-shaped recording medium, and said second function is further calculated using said value corresponding to said material of said disc-shaped recording medium.

15. The magneto-optical recording and reproducing method of claim 13, wherein said first function is further calculated using a value corresponding to a material of said disc-shaped recording medium.

16. The magneto-optical recording and reproducing method of claim 13, wherein said second function is further calculated using a value corresponding to a material of said disc-shaped recording medium.

* * * * *

UNITED STATES PATENT AND TRADEMARK OFFICE
CERTIFICATE OF CORRECTION

PATENT NO.: 6,044,043
DATED: 03/28/00
INVENTOR(S): YOSHITAKA AOKI ET AL.

It is certified that errors appear in the above-identified patent and that said Letters Patent is hereby corrected as shown below:

In the Abstract, all the incidence of "shape" should have read "shaped".

Signed and Sealed this

Twenty-second Day of May, 2001

Attest:

NICHOLAS P. GODICI

*Attesting Officer*  *Acting Director of the United States Patent and Trademark Office*